UNITED STATES PATENT OFFICE 2,473,750

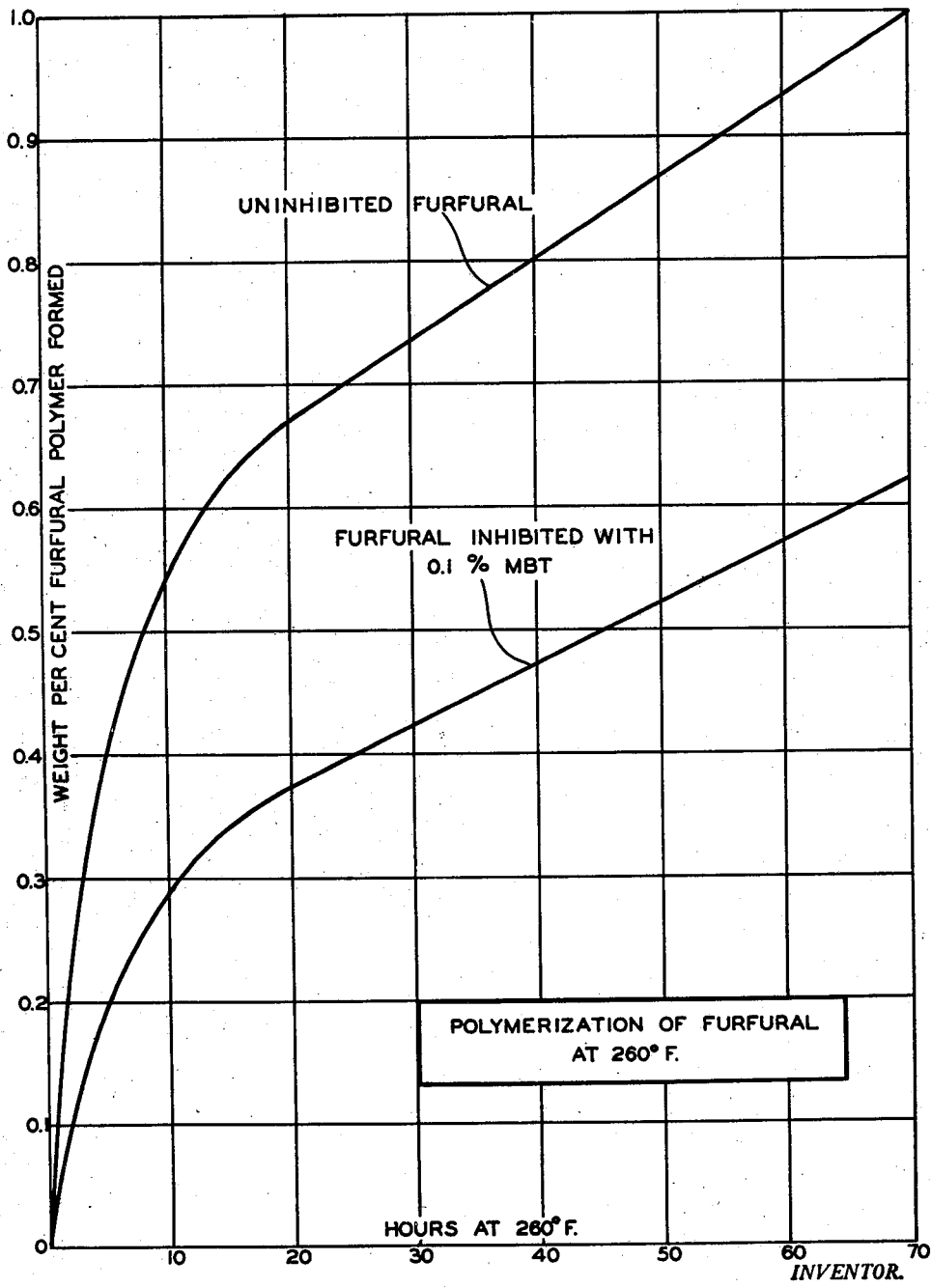

INHIBITING POLYMERIZATION AND CORROSIVENESS OF FURFURAL BY MERCAPTOBENZOTHIAZOLE

John C. Hillyer, Bartlesville, Okla., and Daniel A. Nicewander, Borger, Tex., assignors to Phillips Petroleum Company, a corporation of Delaware Application October 23, 1945, Serial No. 624,048

11 Claims. (Cl. 202—39.5)

This invention relates to methods for inhibiting polymerization and corrosiveness in furfural. More specifically this invention relates to methods for the inhibition of furfural polymerization and simultaneous inhibition of corrosiveness of furfural by the addition of organic compounds to the furfural. This invention is particularly concerned with the problem of inhibiting furfural polymerization and the development of corrosiveness in furfural in those processes wherein furfural is maintained at elevated temperatures for extended periods of time under conditions conducive to the formation of resinous materials.

Furfural is widely employed in commercial processes. One of its principal uses is as a selective solvent for the separation of compounds or groups of compounds whose volatilities are so nearly equal as to make their separation by fractional distillation impractical. Furfural is widely used in the refining of rosin, its modifications and derivatives, in the refining of natural drying oils and in the removal of undesirable olefinic and diolefinic constituents from lubricating oils. Furfural is also widely used in extractive distillation processes wherein a substance or substances are selectively absorbed in furfural from a mixture undergoing fractional distillation in a distillation column. Such absorption of one or more components of the mixture in furfural enables separation of compounds whose volatilities are so nearly identical that separation by ordinary fractionation is not feasible. Thus, from $C_4$ hydrocarbon fractions produced by such refinery operations as catalytic or thermal cracking there may be obtained streams of substantially pure normal butenes, butadiene and olefin-free normal and isobutane streams. The dehydrogenation of n-butane yields n-butenes which may be separated from the butane by furfural extractive distillation to yield a recycle stream substantially free from unsaturates. Similarly, products resulting from the dehydrogenation of n-butenes may be segregated to give essentially complete recovery of 1,3-butadiene in the state of purity required for the manufacture of synthetic rubber and yield a stream of substantially diolefin-free butenes for recycling to the dehydrogenation catalyst. Other applications of the selective action of furfural are numerous. Our invention is applicable to furfural used in these or any other applications where the problem of polymerization is encountered.

In the various commercial processes utilizing the selective solvent action of furfural elevated temperatures are often maintained over an extended period of time, as the solvent circulates throughout the system. While furfural is known to darken fairly rapidly when stored at atmospheric temperatures, with the concomitant formation of tarry or resinous polymerization products, the formation of said polymeric materials is greatly accelerated as the temperature is increased. In commercial systems the temperature is often maintained at about 200–300° F. or higher thereby promoting the formation of tarry products which accumulate in the vital parts of the equipment such as valves, pumps, heat exchanger tubes and the like and seriously interfere with flow and operation of the process. In extreme cases polymer formation may occur to such an extent as to block transfer lines. In addition to operational difficulties caused by polymer accumulation the selectivity of the solvent is markedly decreased thereby and may render the desired separation unsatisfactory or even impossible.

In order to avoid the operating difficulties inherent in furfural-extraction systems and to maintain solvent selectivity at high level it has heretofore been necessary to provide facilities for the removal of polymeric materials. Polymer removal has been accomplished by installing means for periodic distillation of the solvent or a continuous distillation has been provided whereby a sufficient portion of the circulating stream is distilled at such rate as to keep the polymer content below a certain level. Methods now in use for purifying furfural used in recovery of butene or butadiene from $C_4$ hydrocarbon streams are described in detail in the copending application of Hachmuth, Serial No. 460,874, now Patent No. 2,372,668 dated April 3, 1945, and in U. S. patents to Buell et al. 2,350,584 and Hachmuth 2,350,609, to which attention is directed for further background. The methods hitherto proposed accomplish satisfactory elimination of the polymer, but at the same time result in an appreciable loss in the volume of the solvent. The cost of replacing the solvent often becomes a major factor in the total operating cost and may be sufficient to render the process commercially unattractive. While certain operating difficulties may account for losses of furfural, it has been found that the formation of heavy polymer is responsible for the major portion of the loss. Complete or partial elimination of polymer formation is highly desirable and accomplishment of this object would constitute a valuable advance in the art of furfural extraction.

To attain this object the addition of small quantities of antioxidants, particularly pyrogallol, has been proposed but this expedient has not been found to give satisfactory results in commercial operations. While it is known that oxygen promotes resin formation in furfural, oxygen-containing gases are excluded from substantially all commercial units. Antioxidants, therefore, exert no protective action against resin formation which proceeds rapidly at elevated temperatures in systems from which oxygen is excluded. In fact, conventional antioxidants such as phenols and amino compounds are known to react with furfural at elevated temperatures, to form non-volatile products, thus causing appreciable solvent loss as well as accumulation of large quantities of solid materials.

Our invention is particularly applicable to furfural in use as a solvent in the extractive distillation of hydrocarbon streams to recover unsaturated hydrocarbons such as olefins and/or diolefins from admixture with other aliphatic hydrocarbons; for example normal butene and/or butadiene from $C_4$ hydrocarbon streams, this being the principal present commercial application of extractive distillation with furfural as a means for recovering unsaturated hydrocarbons. However, our invention may be applied wherever furfural is used as the solvent in the recovery of other aliphatic olefins or conjugated aliphatic diolefins from admixture with other aliphatic hydrocarbons by extractive distillation.

In extractive distillation solvent extraction is combined with continuous fractional distillation, the furfural being supplied continuously to the top of the column and descending therein. The mixture of hydrocarbons comprising the feed is introduced at an intermediate point in the column and ascends the column as vapor in countercurrent flow to the descending furfural and is intimately contacted therewith by means of bubble cap trays, packing, etc. The column is supplied with a reboiler at the bottom and means for condensing overhead vapors and returning condensate as reflux to the top of the column. The separation of butadiene in this manner is shown in the copending applications of Hachmuth, Serial No. 454,312, now Patent No. 2,415,006 dated January 28, 1947, filed August 10, 1942, and Serial No. 438,844, now Patent No. 2,434,796 dated January 20, 1948, filed April 13, 1942. The latter application also discloses the separation of normal butene from normal butane and is directed to the use of a solvent consisting of furfural containing dissolved water in amount ranging from 1 per cent up to saturation. This dissolved water substantially lowers the boiling temperature of the furfural. The temperature at the bottom of the extractive distillation column is the boiling point of the liquid at that point under the operating pressure of the column. The operating pressure is sufficiently high to permit condensation of a portion of the overhead vapors for reflux. The liquid in the bottom of the absorption column is composed of furfural having dissolved therein water and selectively absorbed hydrocarbons. This bottoms liquid is withdrawn and is introduced into another column at a point near the top. In this second column conditions of temperature and pressure are maintained such that the dissolved unsaturated hydrocarbons are stripped out of the furfural and pass overhead while a bottoms liquid comprising lean furfural is obtained. This lean furfural is cooled and returned to the absorption column. The stripper column is provided with a reboiler at its bottom and means for condensing overhead vapors for reflux. Ordinarily the furfural absorber and stripper columns are operated with bottom temperatures of 300 to 325° F. and under pressures of 50 to 65 p. s. i. g. In furfural rerun units, which may be operated continuously, temperatures of 200 to 300° F. and pressures ranging from atmospheric to 40 p. s. i. g. are commonly maintained. Thus it will be seen that the furfural is continuously being subjected to repeated vaporization at relatively high temperatures. The combined influence of heat, pressure, iron and iron salts, acids, moisture and hydrocarbons, especially unsaturated hydrocarbons, and other factors as yet but little understood increases the rate of polymerization of the furfural. Due to the scarcity and high cost of furfural the loss in this manner has been a serious problem. The problem becomes more serious when we consider that to date the best available information indicates that the polymerization of furfural is auto-catalytic.

Furfural, as ordinarily purchased, contains some acids, quantities of about 0.1 per cent by weight, calculated as acetic acid, being common. Small quantities of heavy residues of complex and largely unknown composition are also present. In the presence of water, which is generally used in these extractive distillation systems, and at elevated temperatures these acids and unknown heavy residues become highly corrosive to steel. Corrosion has often been a major problem in operation of these commercial units employing furfural and a cause of serious financial loss and interrupted operations. Furthermore, it is known that small quantities of iron salts accelerate the rate of polymerization of furfural and corrosion of the iron vessels containing the furfural will generally result in the presence of small quantities of iron salts in the furfural stream.

It is an object of this invention to provide a method for simultaneously inhibiting polymer formation and corrosiveness of furfural in extractive distillation systems operated at elevated temperatures, especially in the recovery of unsaturated aliphatic hydrocarbons such as butene or butadiene.

Another object of this invention is to provide a method for reducing corrosion of extractive distillation equipment while reducing the rate of formation of high-boiling tars, resins and other non-volatile polymeric materials in furfural used therein.

Still another object of this invention is to provide a method for reducing the accumulation of heavy polymer deposits in furfural extractive distillation systems operated at elevated temperatures.

Still another object of this invention is to provide a method for maintaining furfural in extractive distillation systems in a high state of selectivity while simultaneously reducing polymer formation therein.

Other objects and features of novelty will become apparent to those skilled in the art as this disclosure proceeds.

The accompanying drawing portrays graphically the inhibition of furfural polymerization by means of mercaptobenzothiazole in a specific embodiment of this invention, as determined by actual laboratory tests.

We have found that the formation of heavy polymers, tars, resins and the like can be greatly retarded by the addition of small quantities of the chemical compound mercaptobenzothiazole to furfural. Mercaptobenzothiazole is well known to act as a corrosion inhibitor in steel vessels containing hydrocarbon fluids and water, see U. S. Patent 2,111,990 to Reid and Short, and is often employed for this purpose. We have found that this corrosion inhibiting effect of mercaptobenzothiazole is also exerted in the furfural-water systems usually present in extractive distillations. This effect exists in combination with the effect of preventing polymerization of the furfural. Furthermore, it is known that small quantities of iron salts tremendously accelerate the rate of polymerization in furfural, and corrosion of iron vessels by free acids generally results in the presence of small quantities of such salts in the furfural stream. Suppression of corrosion by the mercaptobenzothiazole thus results in a further and secondary suppression of polymerization through the prevention of the formation of these accelerating salts.

The inhibitor may be added to the system by any convenient means. It may be introduced directly in powdered form, or prepared as a concentrated solution or as a slurry and pumped into the furfural stream. Solutions or slurries in benzene or other aromatic solvent may also be used in some cases. Generally, however, it is desirable to keep extraneous solvents out of the furfural because of adverse effects on foaming and other surface phenomena in the system, or contamination of the streams which the furfural is being used to refine.

The quantity of inhibitor required depends on the rate of polymerization of the solvent in the system under consideration. Among the factors affecting the rate of polymerization may be mentioned the temperature, the time which a given sample of furfural is subjected to elevated temperatures, the presence of certain heavy metals such as iron, copper, tin and lead and their salts, and the presence of other substances such as water, oxygen, tars, gums and the like. The polymer itself has been shown to exert an accelerating effect on the rate of polymerization. Free mineral acids, particularly hydrochloric acid, even when present in minute quantities also have a pronounced accelerating effect on the polymerization rate. Among the metal salts which may be present in the furfural stream, iron salts, particularly ferric chloride, are especially active in promoting the formation of resinous materials. Since variations in these factors will be found in different systems employing furfural, it is obvious that the individual cases must be studied in order to determine the amount of inhibitor necessary to effect optimum results. The optimum quantity of inhibitor is best determined experimentally by making tests on small samples withdrawn from the system. In general the amount of inhibitor may vary from about 0.01 per cent to about 0.5 per cent by weight of the furfural although in special cases quantities as high as 1 per cent may be used.

The concentration of inhibitor maintained throughout the stream is an important factor in the satisfactory operation of the present invention. Generally either continuous or intermittent addition of a small quantity of fresh inhibitor is required in order that the desired concentration is realized. Gradual loss of inhibitor results from reaction with various materials in the system and from mechanical loss, particularly that occurring in systems utilizing a redistillation process to eliminate heavy polymer from the solvent. The amount of inhibitor present must not be allowed to exceed the maximum value determined for any particular case. In general, amounts of 0.5 per cent to 1.0 per cent and above are to be avoided since increasingly large amounts of this compound appears to promote rather than to retard the rate of polymerization. At elevated temperatures it is possible that the inhibitor reacts with the furfural although no evidence of such activity is observed when the concentration is maintained within the preferred limits of our invention.

According to the process of our invention the addition of mercaptobenzothiazole will generally effect a reduction of from 25 to 80 or 90 per cent in the polymerization rate of furfural and in some cases substantially complete reduction is accomplished. The small quantities of polymer which gradually accumulate are then removed by suitable means such as continuous distillation. Through the use of our inhibitor replacement costs of the solvent and equipment are kept at a minimum and the operating expense attendant in the redistillation process becomes of minor importance.

The accompanying drawing portrays the result of a laboratory study of the action of mercaptobenzothiazole in inhibiting polymerization of furfural in steel vessels. A lot of furfural was obtained from a commercial extractive distillation system employing this solvent to separate butene from butadiene. Samples of this lot were placed in steel reaction tubes and there was also added to each a short length of ordinary black iron pipe. To one of these test vessels there was added 0.10 per cent by weight of mercaptobenzothiazole and another test was left uninhibited for purposes of comparison. The two vessels were sealed and subjected to heating at 260° F. under identical conditions. At intervals samples of the furfural were withdrawn from the tubes, and the quantity of polymer formed was determined and plotted as shown. Direct comparison between the rate of polymerization of the inhibited and uninhibited furfural was thus made possible. The graph shows the marked reduction in polymerization rate brought about by the use of mercaptobenzothiazole. In the plant, of course, the furfural is maintained within steel vessels and may circulate through iron pipes. It is known that the furfural contains substantial acidity and that any iron salts resulting from corrosion of the vessels thereby will greatly accelerate the rate of polymerization. This test in the steel tubes using plant furfural is an attempt to simulate plant conditions in the laboratory.

The following examples are included to illustrate further the present invention; however, it is not intended that they be interpreted as limitations of the scope of this invention.

*Example I*

In order to determine the effect of mercaptobenzothiazole as an inhibitor of furfural polymerization, 0.10 part of this compound and 5 parts of water were added to 100 parts of a furfural sample obtained from the circulating stream in a commercial unit employing this solvent for the separation of butanes, butenes and butadiene. Aliquot portions of this mixture were placed in a series of glass tubes, the air was replaced by nitrogen and the tubes were sealed. The temperature was maintained at 260° F. throughout the test. Tubes were cooled and opened at intervals and the non-volatile polymer content determined by a rapid vacuum distillation. The method comprises the rapid distillation of substantially all the furfural, the removal of traces of volatile matter by suitable means, and weighing the residue. The rate of formation of non-volatile polymer was established by comparison of each sample with similar analysis made on the furfural-water-mercaptobenzothiazole mixture immediately after it was prepared. Tests carried out over a 48-hour period showed the rate of polymer formation averaged 0.11 weight per cent of the furfural per day. A series of tests run simultaneously using furfural from the same source but without the addition of inhibitor showed a polymerization rate of 0.21 weight per cent of the monomer per day. The reduction in polymerization realized by the use of the inhibitor was 48 per cent.

Example II

To a sample of 100 parts by weight of furfural obtained from a commercial extractive distillation unit as in Example I were added 5.0 parts of water and 0.1 part mercaptobenzothiazole. The mixture was placed in a steel cylinder, a piece of ordinary steel pipe added, the air was displaced by nitrogen and the cylinder placed in a bath at 260° F. in order to maintain the temperature at a constant level. Pressure in the cylinder was held at 40 pounds gage with nitrogen. Portions of the mixture were withdrawn at intervals and the polymeric products determined in the usual manner. The rate of formation of non-volatile material, over a 72 hour period, averaged 0.21 weight per cent when no inhibitor was used, or a reduction of 38 per cent.

Example III

To 100 parts by weight of furfural obtained from a commercial extractive distillation as in Example I were added five parts of water and 0.1 part mercaptobenzothiazole. The mixture was placed in a steel cylinder, the air was displaced by nitrogen and the cylinder placed in a bath at 320° F. in order to maintain the temperature at a constant level. Pressure in the cylinder was held at 60 pounds gage with nitrogen. Portions of the mixture were withdrawn at intervals and the polymeric products determined in the usual manner. The rate of formation of non-volatile material, over a 48 hour period averaged 0.31 weight per cent of the furfural per day at this higher temperature as against 0.48 per cent when no inhibitor was added, or a reduction of 35 per cent.

Example IV

To samples of furfural obtained from a commercial extractive distillation unit containing 5.0 parts of water per 100 parts of furfural there was added 0.1 part by weight of mercaptobenzothiazole. These samples were placed in steel bombs, and to one was added polished steel strips and to another polished brass strips. The bombs were closed, heated in a bath at 260° F., and sampled at intervals for determination of non-volatile polymer content as in Example III. The rate of formation of polymer over a 40 hour period averaged 0.21 weight per cent per day in the tube containing steel strips and 0.22 per cent in that containing brass. Tests run simultaneously under the same conditions in which no inhibitor was added gave average rates of 0.29 and 0.28 per cent respectively. Reductions of 28 per cent and 17 per cent respectively were thus realized. The strips present in the uninhibited furfural were very bright on the surface, indicating acidic corrosion, while those in the inhibited tests assumed the normal slightly dull surface characteristic of little or no corrosion.

We claim:

1. An improved selective solvent comprising furfural in intimate admixture with a minor proportion of mercaptobenzothiazole as polymerization inhibitor for the furfural.

2. An improved selective solvent comprising furfural in intimate admixture with 0.01 to 1.00 weight per cent of mercaptobenzothiazole as polymerization inhibitor for the furfural.

3. An improved selective solvent comprising furfural containing dissolved water in amount ranging from 1 per cent up to saturation and from 0.1 to 1.00 per cent of mercaptobenzothiazole as a polymerization inhibitor for the furfural.

4. A method of inhibiting the polymerization of furfural at a temperature range from atmospheric to about 300° F. which comprises incorporating into said furfural from 0.01 to 1.00 weight per cent of mercaptobenzothiazole.

5. In the extractive distillation of hydrocarbon mixtures containing unsaturated hydrocarbons with furfural as selective solvent, the improvement which comprises preventing polymerization of the furfural by incorporating therein a minor proportion of mercaptobenzothiazole.

6. In the extractive distillation of hydrocarbon mixtures containing unsaturated hydrocarbons with furfural as selective solvent, the improvement which comprises inhibiting polymerization of the furfural by incorporating therein from 0.01 to 0.50 weight per cent of mercaptobenzothiazole.

7. In the extractive distillation of hydrocarbon mixtures containing unsaturated hydrocarbons with furfural containing dissolved water in amount from 1 per cent to saturation as selective solvent, the improvement which comprises inhibiting polymerization of the furfural by incorporating therein from 0.01 to 0.50 weight per cent of mercaptobenzothiazole.

8. In the extractive distillation of aliphatic $C_4$ hydrocarbon mixtures containing unsaturated $C_4$ hydrocarbons in admixture with more saturated $C_4$ hydrocarbons using furfural containing dissolved water in amount ranging from 1 per cent up to saturation as the selective solvent, the improvement which comprises inhibiting polymerization of the furfural by incorporating therein from 0.01 to 0.50 weight per cent of mercaptobenzothiazole.

9. A method for inhibiting formation of polymer in furfural which comprises incorporating a minor proportion of mercaptobenzothiazole in said furfural.

10. A method for inhibiting formation of polymer in furfural which comprises incorporating 0.01 to 1.00 weight per cent of mercaptobenzothiazole in said furfural.

11. In a process for extracting unsaturated hydrocarbons from more saturated hydrocarbons with furfural as a selective solvent, in which furfural is maintained at a temperature between 200 and 325° F. for an extended period and normally undergoes polymerization under such conditions, the improvement which comprises maintaining incorporated in said furfural 0.01 to 1 per cent by weight thereof of mercaptobenzothiazole, whereby polymerization of said furfural at said temperature is less than normal.

JOHN C. HILLYER.
DANIEL A. NICEWANDER.

REFERENCES CITED

The following references are of record in the file of this patent:

UNITED STATES PATENTS

| Number | Name | Date |
|---|---|---|
| 1,797,401 | Calcott | Mar. 24, 1931 |
| 2,111,990 | Reid | Mar. 22, 1938 |
| 2,280,716 | Paulsen | Apr. 21, 1942 |
| 2,366,360 | Semon | Jan. 2, 1945 |
| 2,404,253 | Scarth | July 16, 1946 |